No. 688,154. Patented Dec. 3, 1901.
C. G. BELMER.
EDGE TRIMMING TOOL.
(Application filed July 30, 1898. Renewed May 2, 1901.)
(No Model.)
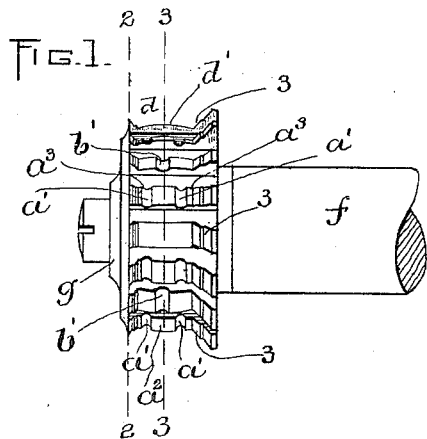
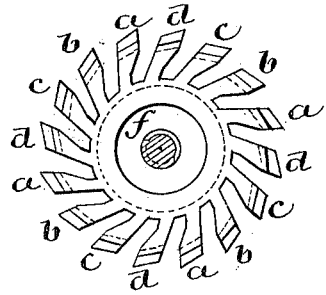
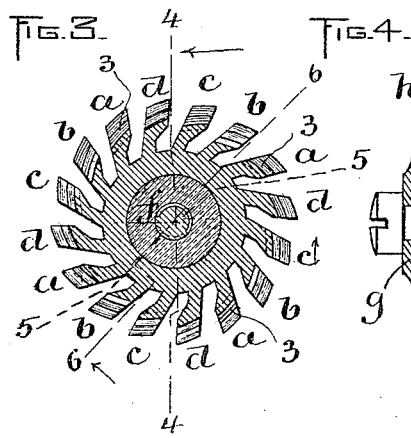
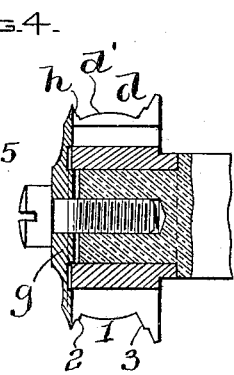
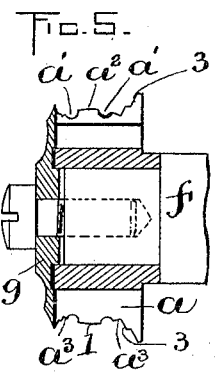
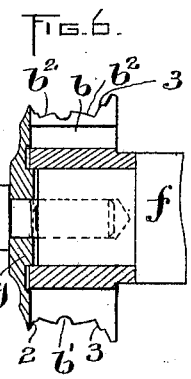
WITNESSES:
H. Brown
P. W. Pezzetti
INVENTOR
C. G. Belmer
by Wright Brown & Quinby
Attys.

UNITED STATES PATENT OFFICE.

CHARLES G. BELMER, OF CHELSEA, MASSACHUSETTS, ASSIGNOR OF ONE-HALF TO ARTHUR A. BRIGGS, OF HAVERHILL, MASSACHUSETTS.

EDGE-TRIMMING TOOL.

SPECIFICATION forming part of Letters Patent No. 688,154, dated December 3, 1901.

Application filed July 30, 1898. Renewed May 2, 1901. Serial No. 58,706. (No model.)

*To all whom it may concern:*

Be it known that I, CHARLES G. BELMER, of Chelsea, in the county of Suffolk and State of Massachusetts, have invented certain new and useful Improvements in Edge-Trimming Tools, of which the following is a specification.

This invention has relation to tools or machines for trimming the edges of the soles of boots and shoes; and it has for its object to provide certain improvements in the same whereby the tool may be rotated with a smaller expenditure of power than heretofore and the efficiency thereof may be enhanced.

To this end it consists of a tool of the character described having its cutting edges each arranged to extend but a portion of the distance across the edge of the sole and not entirely across it, whereby the chips cut thereby are long and narrow and do not clog the tool and whereby the force or power necessary to remove them is consequently decreased. The cutting edges are arranged to "break joints," as it were—that is to say, one edge attacks the central or middle portion of the edge of the sole, the next cutting edge attacks the outer portions of the edge of the said sole, while the next cutting edge extends, if desired, entirely across the sole, so as to remove whatever rough or unfinished portions that may be left by the preceding cutting edges.

Reference is to be had to the accompanying drawings, and to the characters thereon, forming a part of this specification, these characters designating the same parts or features, as the case may be, wherever they occur.

Of the drawings, Figure 1 represents in side elevation a cutting-tool embodying my invention. Figs. 2 and 3 represent sections through the same on the lines 2 2 and 3 3 of Fig. 1. Figs. 4, 5, and 6 represent sections taken, respectively, on the lines 4 4, 5 5, and 6 6 of Fig. 3, the same showing different cutting edges.

Referring to the drawings, the tool is shown as provided with a series of cutting-blades $a$, $b$, $c$, and $d$, extending out from a hub $e$ in the ordinary way, said hub being mounted on an arbor $f$ in juxtaposition to the shield or guard $g$. Each blade has a curved cutting portion 1 for the central portion of the edge of the sole, a straight outwardly-extending portion 2 for cutting the edge of the sole near the rand-crease, and a similar straight portion 3 for cutting the lower edges of the sole. On all of the blades the two outer straight portions 2 3, which diverge from the central portion are the same, for purposes hereinafter explained. The central or middle portions of the blade, however, differ in that the one indicated as $a$ is provided with two grooves $a'$ $a'$, which break up the cutting edge and leave a comparatively large inner portion $a^2$ and two small outer portions $a^3$. The next blade $b$ is provided with a groove $b'$, which divides the cutting edge into two portions $b^2$ $b^3$. The blade $c$ is similar to the blade $a$, while the blade $d$ has a cutting edge which is continuous from end to end. By this arrangement it will be seen that each blade will plow into the stock and remove a very narrow long chip, and consequently the chips may be readily disposed of and do not operate to clog the tool. Moreover, the power requisite to drive the cutter is greatly reduced, as will be apparent to those skilled in the art.

Every fourth blade has a cutting edge continuous from end to end; but it will be understood that, if desired, every alternate one may have an edge of this kind.

It will be seen that each of the blades has an operative portion close to each of the outwardly-projecting blades 2 and 3, which latter are uniform throughout the series to properly form the extreme outer portions of the edge of the sole, and said uniform portions 2 and 3 serve to guide the tool as a whole and prevent it from moving in the direction of its axis, and it will be further seen that the operative portion of the blades breaks joint, as it were, whereby the chips plowed up by one blade are not entirely severed by the next succeeding blade, but are relatively long and narrow.

The blades are arranged in a plurality of series, each series comprising four blades, $a$, $b$, $c$, and $d$, as described; but it will be understood that there may be as many blades in each of the series as desired, whether more or less than four, and that I do not limit myself to any particular number of series.

The uniform portions 2 and 3 of the series of cutting-blades by engaging and trimming the extreme outer portions of the edge of a sole insure the proper movement of the tool if moved along the sole or serve to guide the sole if the latter is fed relatively to the tool, thus preventing irregular work by any tendency of the non-uniform parts of the blades to cause a lateral movement of the tool and work relatively to each other.

Having thus explained the nature of my invention and having described a way of constructing and using the same, I now declare that what I claim is—

1. An edge-trimming tool whose blades are provided with cutting edges, each cutting edge being adapted to remove a portion of the edge of the sole less than the entire width of the edge of the said sole, all of the blades having uniform cutting and guiding portions.

2. A tool of the character described, provided with a plurality of cutting-blades, having edges, some of which are broken away, whereby each edge cuts one or more narrow chips, said cutting edges breaking joint, all of the blades having uniform cutting and guiding portions.

3. A tool of the character described, provided with a plurality of cutting edges arranged in series, each series comprising a broken cutting edge and a succeeding continuous edge, and all of the cutting edges having uniform portions at their ends.

4. A tool of the character described, provided with a plurality of cutting edges arranged in series, each series comprising a cutting edge with a groove between its ends, and a cutting edge with a groove near each of its ends, and all of the cutting edges having uniform portions at their ends.

In testimony whereof I have affixed my signature in presence of two witnesses.

CHARLES G. BELMER.

Witnesses:
MARCUS B. MAY,
PETER W. PEZZETTI.